United States Patent [19]
Redden

[11] Patent Number: 5,660,140
[45] Date of Patent: Aug. 26, 1997

[54] METHOD AND SYSTEM FOR USING COAL MINE WATER RUNOFF BY RAISING COLD WATER FISH THEREWITH

[76] Inventor: Edsel E. Redden, P.O. Box 514, Daniels, W. Va. 25832

[21] Appl. No.: 638,659

[22] Filed: Apr. 29, 1996

[51] Int. Cl.$^6$ .................................................. A01K 63/04
[52] U.S. Cl. ........................................... 119/215; 119/217
[58] Field of Search .................................. 119/215, 217, 119/226, 228, 263

[56] References Cited

U.S. PATENT DOCUMENTS

| | | | |
|---|---|---|---|
| 2,238,281 | 4/1941 | Olki | 119/215 |
| 3,617,560 | 11/1971 | Deul et al. | 210/47 |
| 4,072,798 | 2/1978 | Sisler et al. | 429/2 |
| 4,399,769 | 8/1983 | Casey | 119/232 |
| 4,972,801 | 11/1990 | Hunt | 119/215 |

*Primary Examiner*—Robert P. Swiatek
*Assistant Examiner*—Yvonne R. Abbott

[57] ABSTRACT

A method and system are provided for using coal mine water effluent and for raising cold water fish. The method involves aerating coal mine water effluent having a water temperature of from 12 degrees Celsius to 15 degrees Celsius, and directing the water to a container having water and fish therein. The fish are preferably selected from rainbow trout, sturgeon, arctic char and Atlantic salmon. The system involves a coal mine having water effluent at a temperature of from 12 degrees Celsius to 15 degrees Celsius, an aeration device for aerating the water effluent to produce aerated water, means for carrying the water effluent from the mine to the aeration device, a container containing fish and water, and means for carrying the aerated water from the device to the container. The method and the system solve the problem of what to do with water effluent from the coal mines, and provides for a source of optimum temperature water without the undesired expenses of high energy consumption in adjusting water temperature and pumping water.

20 Claims, 1 Drawing Sheet

METHOD AND SYSTEM FOR USING COAL MINE WATER RUNOFF BY RAISING COLD WATER FISH THEREWITH

BACKGROUND OF THE INVENTION

1. Field of the Invention

The present invention relates to methods and systems for using coal mine water runoff and to methods and systems for raising fish, and more particularly relate to methods and systems for using coal mine water runoff and to methods and systems for raising cold water fish.

2. Description of the Related Art

Historically, coal mines in mountainous sedimentary rock formations, such as those found in the states of Virginia, West Virginia and Kentucky, have often suffered from undesired high flow rates of water therein from the surrounding sedimentary rock. These coal mines are often located elevationally between the top of the mountains (hills) and the valleys (base) of the mountains (hills), thereby creating a potential hydraulic head between rainfall contacting and seeping into the upper elevations of the mountain and the coal mine in the intermediate portion of the mountain. This hydraulic head and rainfall have coupled to produce high flow rates of water into these coal mines which had to be diverted in active coal mines by pumping therefrom to permit removal of coal and have resulted in often undesired high volumes of water effluent from inactive coal mine creating some concerns for the mine owners if the water contained undesirably high levels of nitrogen, iron or sulfur, or contained undesirably low levels of oxygen, in view of the potential impact to fish populations in adjacent streams.

Simultaneously, fish farming operations have typically struggled to find ideal water sources for their farming operations. Water sources for raising various different types of fish need to have various different characteristics or need to be modified to have the desired characteristics. For example, in Northern Canada, water from a zinc mine is pumped to the surface at around 3 degrees Celsius (Centigrade) and needs to be heated prior to contacting the fish in the fish farm. The preheating (temperature adjustment) and pumping of the water can add a substantial and undesired expense to the fish farming operation.

Various breeds of fish have different optimum growing temperatures. For example, in temperate climates, the fish which have evolved in those climates need relatively warm water compared to fish in arctic climates which need relatively cooler water for their optimum growing conditions. Consequently, conventional wisdom has often focused on raising warm water fish in warm climates and cold water fish in cold climates. For example, various fish farms have been developed which raise the fish in existing bodies of surface water, but such bodies of water are often subject to some temperature fluctuations and/or to contamination with native parasites (molds, fungi, bacteria, and other organisms) which can kill substantial portions of the fish population or can substantially weaken the populations and decrease their growth rates. Consequently, there is a desire to provide constant, optimal water temperatures for raising fish populations and there is desire to provide organism free water sources. Prior attempts to find and utilize constant temperature water sources have typically focused on aquifers, such as are used in many fish farms in Idaho, but such aquifers experience water usage demands from multiple sources including grain agriculture which could eventually diminish the availability of such a water source to the regional fish farms or could be depleted to the point that pumping of the water would be required to bring the water to the surface. Additionally, there is a high demand for various cold water fish species, but as painted out above various of the farming methods for these fish have had problems.

Additionally, fish farms have been created by pumping water from active and inactive coal mines (see for example of a pump based system see an article by Edsel E. Redden, *Minefish Thriving in Fayette County* fall 1993 Green Lands magazine) but such pump based systems risk economic unfeasibility due to equipment costs and power costs. Many coal mines are located in remote regions, and a fish farm based on such mines utilizing a pumping system will risk power outages thereby either exposing the fish farm to lost production and lost aquatic life due to a prolonged stoppage of water flow or will require the expenditure of funds to provide an adequate backup generator. Additionally, fish farms which have used ponds, risk environmental temperature fluctuations that can negatively impact the growth rate of the fish being farmed.

Consequently, there is a need for a reliable means for utilizing coal mine effluent water and there is a need for providing a reliable source of organism free constant temperature (at a desired temperature) high flow rate (free flowing) water for raising cold water fish species.

SUMMARY OF THE INVENTION

The present invention provides a method and system for raising fish (fish farming) utilizing coal mine water. The water provided from coal mines is typically free flowing, constant temperature and free of parasitic organisms. The method involves (a) obtaining a flow of water from a coal mine, (b) aerating the water (and preferably removing contaminates), (c) flowing the water into a container having fish and water therein. The system involves (a) piping for carrying water effluent from a coal mine, (b) an aeration device for receiving water flow from the piping (the aeration device may also function as a water conditioning device for removing contaminants from the water), (c) means for flowing water from the aeration device to a fish farming container, and (d) means for permitting excess water to flow from the container. The method and system permit high volume high growth rates of cold water fish under constant temperature, high water flow rate conditions.

Detailed Description of the Invention

Figure 1:
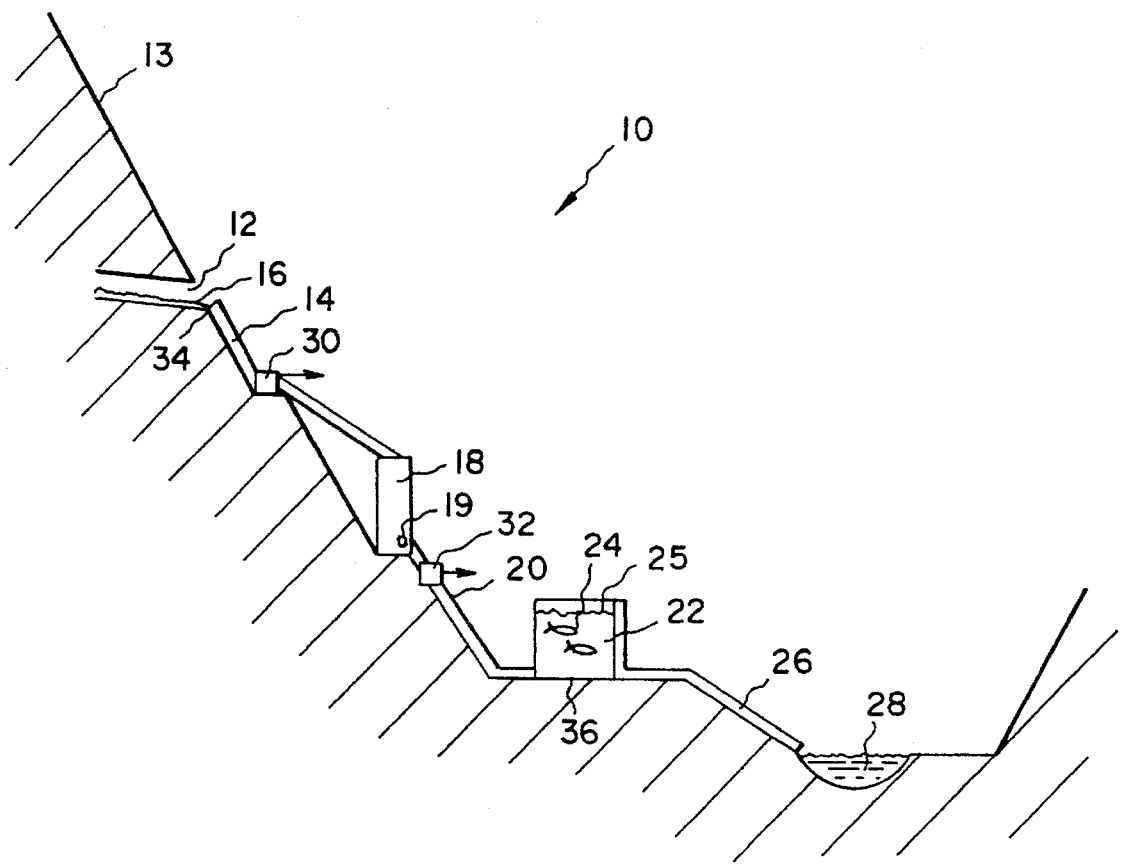
FIG. 1 is a schematic of the system of the present invention located adjacent an abandoned (inactive) coal mine.
Figure 2:
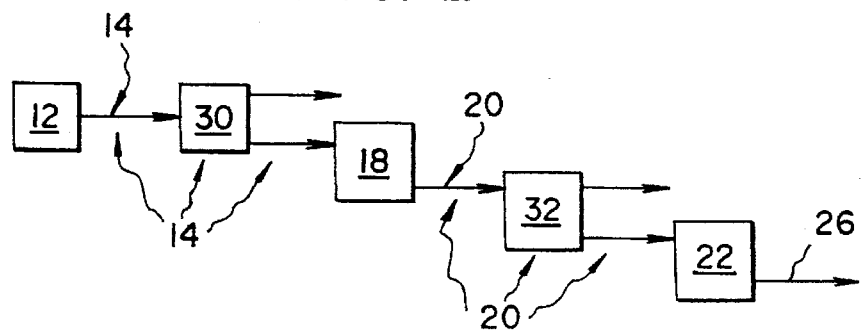
FIG. 2 is a schematic of the system of the present invention according to FIG. 1.

As best shown in FIG. 1, the system (10) of the present invention comprises (a) a coal mine (12) having a water effluent (16), (b) means (14) for carrying at least a portion of the water effluent (16) from the coal mine (12), (b) an aeration device (18) for receiving and aerating the carried water to produce aerated water (19), and (c) means (20) for carrying the aerated water (19) to a fish farming container (22) containing fish (24) and container water (25). Preferably, the system (10) further comprises (d) means (26) for carrying excess water from the container (22) to a mountain stream (28) for discharge into the environment. Optionally, a diversionary unit (30) may be positioned between the coal mine (12) and the aeration device (18) for diverting a portion of the effluent to the environment prior to aeration in the event that flows from the coal mine (12) are in excess of the flows needed for the container (22). Also optionally, a diverting element (32) may be positioned between the aeration device (18) and the container (22) to divert a portion of the flow from the aeration device (18) to the environment prior to flowing to the container (22) in the event that the flow from the aeration device (22) is in excess of the flows needed for the container (22).

As stated above, coal mine effluents have historically been considered a problem and a liability rather than an asset, and the present invention solves various problems associated with such effluents.

Ground water temperatures tend to be within several degrees of the average annual temperature of the climate of the above ground environment. Consequently, ground water temperatures in the northern hemisphere tend to decrease in the northerly direction. As a general rule, for the states of Virginia, West Virginia and Kentucky, the temperatures of coal mine effluents are generally in the range of from 12 degrees centigrade to 15 degrees centigrade. The present invention involves finding a particularly useful use for the water in the raising of certain cold water fish having optimum growth rates at temperatures of between about 12 degrees centigrade and 15 degrees centigrade. In other words, the system and method of the present invention are particularly useful in the fish farming (raising) of the cold water fish species of arctic char, sturgeon, Atlantic salmon and rainbow trout. By using coal mine water effluents having natural water temperatures of between 12 degrees Celsius and 15 degrees Celsius, preferably 13 degrees Celsius and 14 degrees Celsius, the optimum growth rates of the above species can be achieved without the costly step of preheating (or precooling) the ground water. Conventional wisdom would lead one interested in optimizing fish farming production (with a minimum of energy expense) to attempt to raise the above cold water species in colder climates than those encountered in West Virginia, Virginia and Kentucky, but the present invention provides for energy efficient fish farming of the above species due in part to the natural temperature of the coal mine water effluents in these latitudes (states, regions) and due to the gravity flow of water available from coal mines in these mountainous regions to the mines being typically positioned above the base of the mountains. Additionally, by positioning the container (22) adjacent the mountain (13) containing the coal mine (12), the opportunity for substantial temperature change in the water flow during its travel from the mine to the container is minimized and the hydraulic head of the water flow is sufficient to carry it through the system (10).

One problem with water effluent from coal mines being directly discharged into adjacent mountain streams is that it can contain undesirably high levels of various chemical elements such as iron, sulfur and nitrogen, and can contain lower levels of oxygen than desired. Present method and system adjust the above levels of the chemical elements in the effluent to more desired levels. The aeration device of the present system is preferably a conventional packed column for gas and liquid contact, and provides large surface areas within the packing of the column to facilitate the transfer of oxygen from the atmosphere into the water and the transfer of nitrogen from the water into the atmosphere. The oxygenation (aeration) of the water desirably cause iron to convert to iron oxide and precipitate out of the water (or permit filtration out of the water) and converts sulfur to gaseous sulfur dioxide which degasses from the water.

The water supply provided by the coal mines is also less vulnerable to depletion (and or pressure reduction) from high water demand applications such as grain agriculture than are the giant aquifers of the western United States. It therefore provides a potentially more reliable long term source of free flowing water than do such aquifers, and there are substantially no competing commercial users of this water source. Additionally, the sedimentary rock types generally associated with coal mines facilitate water permeability into the coal mines from the surrounding geological strata, and permits the flow rates desired (and often necessary) for the commercially viable operation of a constant temperature cold water fish farm. The coal mines of West Virginia, Virginia and Kentucky commonly provide water effluent flow rates in excess of 300 gallons per minute, and for fish farming purposes water flow rates of at least 300 gallons per minute are preferred, more preferably at least 500 gallons per minute, and most preferably at least 1,000 gallons per minute. Some coal mines provide water effluent flows in excess of 15,000 gallons per minute.

The most preferred species of cold water fish (24) include salmonoids such as the arctic char, the Atlantic salmon and the rainbow trout, and also include sturgeon. These fish are suitable for fresh water farming.

The system (10) is preferably designed so that the hydraulic head between the point (34) of the coal mine effluent leaving the coal mine and the bottom (36) of the fish container (22) is preferably at least 8 feet, more preferably at least 30 feet, and most preferably at least 50 feet to ensure adequate flow rates of water in a suitably sized fish farm adjacent (and beneath) the coal mine. Preferably the flow distance from the coal mine effluent point (34) to the container (22) is between 100 feet and 2500 feet, more preferably between 200 feet and 2000 feet, and most preferably between 400 feet and 1000 feet.

The aeration device (18) may be any suitable device for oxygenating the water and degassing undesired excess levels of other gases such as nitrogen and sulfur dioxide. Suitable packed columns may be formed by filling columns with conventional high surface area plastic packing such as TRI-PAC TEL-PAC KOCH rings which are available commercially. Preferably the aeration device is sufficient to raise the oxygen level of the water to at least 6 milligrams per liter (mg/l), and preferably to between 7 mg/l and 11 mg/l, and preferably lowers the nitrogen level to less than 100 percent of saturation (at atmospheric pressure), and preferably to between 99 percent and 96 percent of saturation, and preferably lowers the iron level to less than 1 part per million (ppm), and most preferably to between 0.0 and 0.4 ppm, and preferably lowers the sulfur level to less than 1 ppm, and most preferably less than 0.4 ppm.

Water flow rates within the farm system may be further extended by utilizing supplemental oxygenation systems (oxygen tanks feeding pure diatomic oxygen to the containers) (not shown) and by the utilization of biofiltration (filters for extracting undesired biomass and chemicals such as ammonia from the tanks) (not shown). The method and system solve the problem associated with the discharge of untreated coal mine effluent into the environment, and provide a source of water having a temperature range which provides for optimum and steady growth rates of various cold water species of fish. Preferably, the system is entirely or at least primarily a gravity flow system wherein the system is disposed for gravity flow of the water effluent to the aeration device and for gravity flow of the aerated water from the aeration device to the container(s). Preferably, the effluent flows at a steady rate (variance of less than 10% from the average flow rate) from the mine to the device, and preferably the aerated water flows at a steady rate (variance of less than 10% from the average flow rate) from the device to the container(s).

Preferably a plurality of containers are used to raise the fish in, and the flow of aerated water is divided accordingly among the various containers to provide each container with a steady flow of oxygen rich water. The containers thus each have an overflow stream of water as a portion of the water in the container is displaced by the incoming flow of aerated water. The containers preferably have suitable cleaning systems for removing fish waste products and for controlling the ammonia level in the containers. Oxygen from oxygen storage tanks may be used to supplement the oxygen levels of the water in the containers and to maximize the number of fish that can be raised for a given water effluent flow rate. The containers are preferably of various sizes with the small containers being used to raise the younger (smaller) fish, and the larger containers being used to raise the more mature (larger) fish. Conventional commercial fish food products design for each species of fish may be used in the present system and method. Containers preferably have the following sizes in gallons of 200 to 25,000 gallons.

The present method and system is functional without the need for pumps or generators, due to the system and method being entirely operational by gravity flow of water from the mine outlet to the aeration device to the fish container and finally to the environmental discharge point. In other words the present method and system may be free of pumps and power generators and may be operated by water movement forces consisting of gravity flow.

The containers of the present system preferably also provide for solid waste disposal by suitable means such as by providing a solid waste trap and by providing a flushing mechanism for permitting the waste to be flushed from the trap. A suitable system would provide for collection of floating solids as well as sinking solids.

EXAMPLES

A system was developed and tested in West Virginia wherein a free flowing water effluent from an inactive coal mine was gravity flowed from the coal mine using a pipe to carry water to a diverter box wherein the effluent stream was split to allow a portion of the water to gravity flow to the environment and a portion of the water to gravity flow to the top on an aeration device. The aeration device involved two packed columns having dimensions of 10 feet in height and two feet in diameter and being filled with plastic packing (TEL-PAC brand). The aeration device generated sufficient contact surface area between the water and the air to effectively raise the oxygen level of the water from 3 ppm to 9 ppm (ppm is part per million by mass based on the total mass of the water), and lower the iron level from 0.5 ppm to 0.1 ppm, and lower the nitrogen level from 106 percent of saturation (at atmospheric pressure) to 97 percent of saturation. The water flow from the aeration device was more precisely controlled by diverting a portion thereof to the environment, and by allowing the remaining portion (the desired flow rate) to be carried by a pipe to the containers (fish tanks, circular tanks) containing the farm fish. The container had dimensions of four feet in height and seven feet in diameter, and the constant water temperature permitted optimum growth rates for both rainbow trout and arctic char. The high water flow rate maintained the fish farm waters at a relatively constant temperature.

What is claimed is:

1. A method for raising cold water species of fish, said method comprising:

(a) aerating water effluent from an inactive coal mine to produce aerated water, said water effluent exiting said mine at a first elevation, said water effluent having a temperature of from 12 degrees Celsius to 15 degrees Celsius, and (b) flowing said aerated water into a container containing water and said fish, said tank having a top water level elevation, said first elevation being greater than the top water level elevation of the container.

2. The method of claim 1 wherein said fish are selected from the group consisting of salmonoids and sturgeon.

3. The method of claim 1 wherein said method further comprising diverting a portion of the water effluent from the coal mine to the environment and flowing a portion of the effluent.

4. The method of claim 1 wherein said temperature is from 13 degrees Celsius to 14 degrees Celsius.

5. The method of claim 1 wherein said water effluent has an iron level of at least 0.5 ppm.

6. The method of claim 5 wherein said aerated water has an iron level of less than 0.5 ppm.

7. The method of claim 1 wherein said water effluent has a sulfur level of at least 0.4 ppm.

8. The method of claim 7 wherein said aerated water has a sulfur level of less than 0.4 ppm.

9. The method of claim 1 wherein said water effluent has a nitrogen level of at least 100 percent of saturation at atmospheric pressure.

10. The method of claim 9 wherein said aerated water has a nitrogen level of less than 100 percent of saturation at atmospheric pressure.

11. The method of claim 1 wherein said water effluent has an oxygen level of less than 5 ppm.

12. The method of claim 11 wherein said aerated water has an oxygen level of at least 5 ppm.

13. A system for using coal mine effluent and raising cold water fish, said system comprising:

(a) a coal mine having water effluent having a temperature of from 12 degrees Celsius to 15 degrees Celsius;

(b) an aeration device producing aerated water;

(c) means for carrying said effluent from said mine to said device;

(d) a container containing water and fish;

(e) means for carrying said aerated water from said device to said container.

14. The system of claim 13 wherein said water effluent has a temperature of from 13 to 14 degrees Celsius.

15. The system of claim 14 wherein said means for carrying said effluent from said mine to said device is a pipe.

16. The system of claim 15 wherein said means for carrying said aerated water from said device is a pipe.

17. The system of claim 13 wherein said aeration device is a packed column.

18. The system of claim 13 wherein said system is disposed for gravity flow of said water effluent from said mine to said device and for gravity flow of said aerated water from said device to said container.

19. The system of claim 13 wherein said container is a circular tank having a capacity of at least 200 gallons.

20. The system of claim 13 wherein said fish are selected from the group consisting of salmonoids and sturgeon.

* * * * *